United States Patent
Nitsch et al.

(10) Patent No.: US 11,184,220 B2
(45) Date of Patent: Nov. 23, 2021

(54) AUTOMATED REMEDIATION OF INFORMATION TECHNOLOGY EVENTS

(71) Applicant: ENTIT SOFTWARE LLC, Sanford, NC (US)

(72) Inventors: Frank Nitsch, Böblingen (DE); Stefan Bergstein, Böblingen (DE)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/231,028

(22) Filed: Dec. 21, 2018

(65) Prior Publication Data
US 2020/0204434 A1 Jun. 25, 2020

(51) Int. Cl.
*G06F 11/07* (2006.01)
*G06F 11/30* (2006.01)
*H04L 12/24* (2006.01)

(52) U.S. Cl.
CPC ........ *H04L 41/0654* (2013.01); *G06F 11/079* (2013.01); *G06F 11/0793* (2013.01); *G06F 11/3006* (2013.01); *H04L 41/069* (2013.01); *H04L 41/0631* (2013.01); *H04L 41/16* (2013.01); *H04L 41/5074* (2013.01); *G06F 2201/88* (2013.01)

(58) Field of Classification Search
USPC ................................................. 709/220–224
See application file for complete search history.

(56) References Cited

U.S. PATENT DOCUMENTS

| | | | |
|---|---|---|---|
| 9,069,737 B1 | 6/2015 | Kimotho et al. | |
| 9,548,987 B1 | 1/2017 | Poole | |
| 9,876,673 B2 | 1/2018 | Margalit et al. | |
| 10,055,481 B2 | 8/2018 | Ideses et al. | |
| 2010/0077008 A1* | 3/2010 | Davis | G06F 16/93 707/797 |
| 2013/0204821 A1* | 8/2013 | Keith, Jr. | G06F 11/26 706/46 |
| 2014/0129536 A1* | 5/2014 | Anand | G06N 7/005 707/706 |
| 2016/0253246 A1* | 9/2016 | Chow | G06F 11/0706 714/19 |

(Continued)

OTHER PUBLICATIONS

Chowdhury, et al. "Set up automatic remediation of monitoring alerts using Bluemix services", developerWorks, 2017, 20 pages, IBM Corporation, ibm.com/developerWorks/.

(Continued)

*Primary Examiner* — Younes Naji
*Assistant Examiner* — Da T Ton (57) ABSTRACT

A computing device includes a processor and a medium storing instructions. The instructions are executable by the processor to: detect an information technology (IT) event associated with an IT system; determine an event class for the IT event; identify a plurality of event-procedure relations associated with the determined event class, each of the plurality of event-procedure relations having an associated success score; select a first event-procedure relation having a highest success score, wherein the first event-procedure relation specifies a relation between the determined event class and a first remediation procedure; and execute the selected first remediation procedure to remediate the IT event.

19 Claims, 6 Drawing Sheets

(56) References Cited

U.S. PATENT DOCUMENTS

2017/0032091 A1* 2/2017 Rudorfer ................ G16H 40/40
2018/0285750 A1* 10/2018 Purushothaman ..... G06N 5/045

OTHER PUBLICATIONS

"Overview", Neptune.io, Aug. 24, 2018, four pages, http://docs.neptune.io/docs/neptuneio-overview.
Evanios, "Actionable Preditive Analytics for IT Operations", six pages, www.evanios.com.

* cited by examiner

| Relation Identifier 310 | Event Class Identifier 320 | Procedure Identifier 330 | Success Score 340 |
|---|---|---|---|
| ... | ... | ... | ... |
| ... | ... | ... | ... |
| ⋮ | | | |
| ... | ... | ... | ... |

| Relation Identifier 410 | Successful Count 420 | Helpful Count 430 | Unhelpful Count 440 | Base Score 450 | Absolute Push 460 | Overall Score 470 |
|---|---|---|---|---|---|---|
| ... | ... | ... | ... | ... | ... | ... |
| ... | ... | ... | ... | ... | ... | ... |
| ⋮ | | | | | | |
| ... | ... | ... | ... | ... | ... | ... |

AUTOMATED REMEDIATION OF INFORMATION TECHNOLOGY EVENTS

BACKGROUND

Some organizations provide products or services regarding information technology (IT). For example, an IT support department may receive a request for help regarding a hardware and/or software issue (e.g., system unresponsive, application error, etc.). The IT support department may perform one or more actions to resolve the issue. In some examples, the IT support department may use a ticket management system to track the issue and the associated actions.

BRIEF DESCRIPTION OF THE DRAWINGS

Some implementations are described with respect to the following figures.

DETAILED DESCRIPTION

In some information technology (IT) systems, events (e.g., incidents, errors, etc.) may arise that require some response or action. In such cases, an IT organization may be notified of the IT event, and may be responsible for remediating or responding to the IT event. For example, an IT support group may receive an indication that a storage device has failed and is impacting a database. In another example, the IT support group may be notified that a particular application has a response time that exceeds a service level objective, and therefore requires additional processing resources to reduce the execution time. In some examples, a human agent may manually respond to an IT event. For example, a support agent may be notified of the IT event, analyze the IT event, and perform one or more actions to remediate the IT event. However, such manual responses can be inconsistent, time-consuming, and error prone. Further, providing a human support staff in sufficient numbers may involve substantial costs for recruitment, training, salary, and so forth.

As described further below with reference to FIGS. 1-7, some implementations may provide automated remediation of IT events. In some examples, an IT event may be classified into an event class. The event class may be matched to a set of event-procedure relations that are each associated with a calculated success score. The event-procedure relation with the highest score may be selected, and a procedure associated with the selected event-procedure relation may be executed. In this manner, the procedure may be automatically selected and executed to remediate the IT event based on calculated success scores. Accordingly, some implementations may provide improved automated remediation of IT events.

Figure 1:
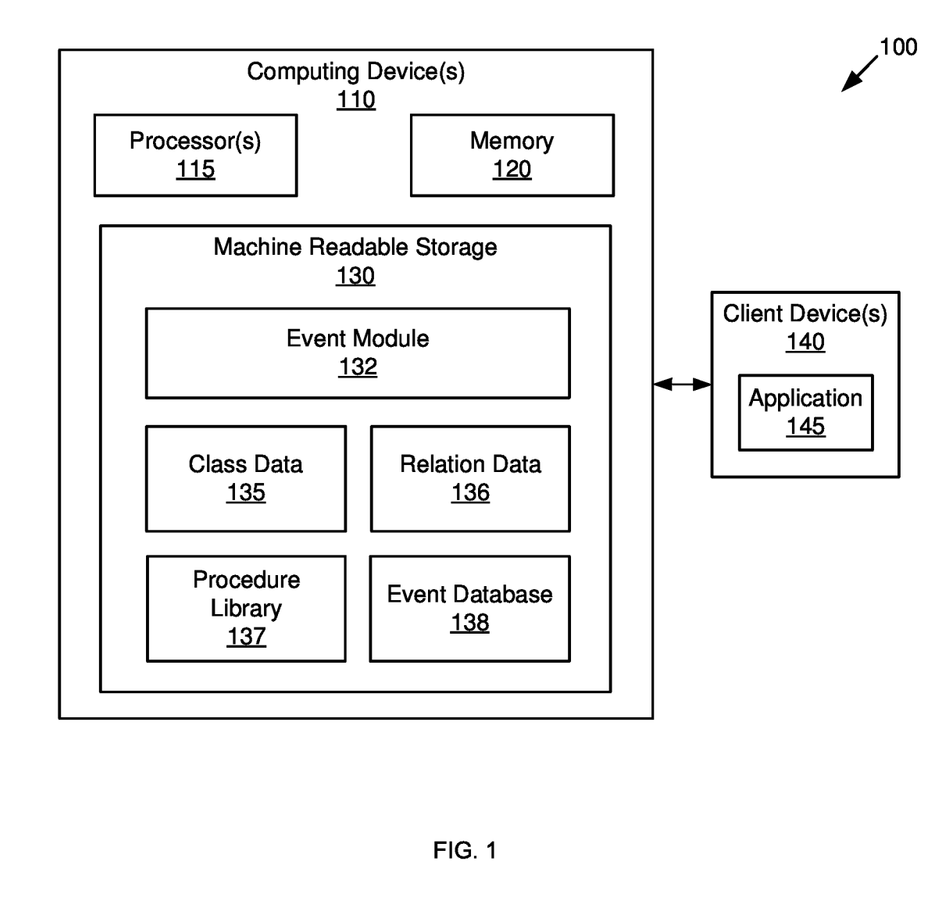
FIG. 1 is a schematic diagram of an example system, in accordance with some implementations.

FIG. 1 is a schematic diagram of an example system 100, in accordance with some implementations. In some examples, the system 100 may include a computing device 110 and a client device 140. The computing device 110 may be, for example, a computer, a portable device, a server, a network device, a communication device, etc. Further, the computing device 110 may be any grouping of related or interconnected devices, such as a blade server, a computing cluster, and the like. Furthermore, in some implementations, the computing device 110 may be a dedicated device or appliance for automated remediation of IT events.

In some implementations, the computing device 110 can interface with the client device 140. For example, the client device 140 may be a terminal or computer that is connected to the computing device via a wired or wireless network. In other examples, the client device 140 may comprise a display screen coupled to (or included in) the computing device 110. As shown, in some implementations, the client device 140 may execute and display an application 145 to a user.

As shown, the computing device 110 can include processor(s) 115, memory 120, and machine-readable storage 130. The processor(s) 115 can include a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include an event module 132, class data 135, relation data 136, procedure library 137, and an event database 138. As shown in FIG. 1, in some implementations, the event module 132 may be implemented as executable instructions stored in the machine-readable storage 130. However, the event module 132 can be implemented in any suitable manner. For example, some or all of the event module 132 could be hard-coded as circuitry included in the processor(s) 115 and/or the computing device 110. In other examples, some or all of the event module 132 could be implemented on a remote computer (not shown), as web services, and so forth. In another example, the event module 132 may be implemented in one or more controllers of the computing device 110. In some implementations, class data 135, relation data 136, procedure library 137, and/or the event database 138 may store data in one or more organized structures (e.g., relational tables, extensible markup language (XML) files, flat files, and so forth).

In one or more implementations, the event module 132 may detect or receive an indication of an IT event. For example, the event module 132 may receive an automated alert indicating that a particular device or component has failed. In another example, the event module 132 may receive a request generated by a user to request some action(s) regarding an IT event (e.g., a support ticket, a form submission, etc.). In one or more implementations, the event module 132 may use the class data 135 to determine a particular event class that is a best match for the IT event. For example, the class data 135 may specify class markers (e.g., keywords, attributes, etc.) that identify each of multiple event classes. The event module 132 may compare keywords and/or attributes associated with an IT event (e.g., text fields in an alert or a request ticket) to the class markers in the class data 135. The event module 132 may identify the event class of the IT event as the event class in class data 135 that has the largest number of class markers that match the keywords and/or attributes of the IT event.

In some implementations, the class data 135 may be generated by analyzing past IT events to identify and characterize event classes. For example, the event module 132 may analyze the event database 138 using classification techniques (e.g., clustering, decision tree, neural networks, naïve Bayes networks, keyword analysis, etc.) to identify a set of classes that IT events can be classified into.

In one or more implementations, the event module 132 may use the relation data 136 to determine a set of event-procedure relations that are associated with the event class of the IT event. As used herein, "event-procedure relation" refers to data that specifies a particular event class and a particular procedure. For example, the relation data 136 may include multiple records, with each record specifying a unique combination of a single event class and a single procedure. In some implementations, the event module 132 may identify each event-procedure relation in the relation data 136 that includes the event class of the IT event. An example implementation of event-procedure relation data is described below with reference to FIG. 3.

In one or more implementations, the event module 132 may select, from the set of event-procedure relations associated with the IT event, a particular event-procedure relation that has a highest success score. For example, in some implementations, the event module 132 may use the relation data 136 to determine the success scores of the set of event-procedure relations that are associated with the IT event. In some examples, the event module 132 may select the event-procedure relation that has the highest success score in the relation data 136. In other examples, the event module 132 may select the event-procedure relation that has the highest number of keywords that match the IT event. In still other examples, the event module 132 may select the event-procedure relation according to a weighted formula based on the number of matching keywords with the IT event and the success score in the relation data 136 (e.g., 70% weight for the success score and 30% weight for number of matching keywords between the event-procedure relation and the IT event."

In one or more implementations, the event module 132 may execute (or cause execution of) the selected event-procedure relation to remediate the IT event. The selection of event-procedure relations and execution of procedures is described further below with reference to FIGS. 2-7.

In one or more implementations, the event module 132 may calculate success scores for event-procedure relations based on historical data included in the event database 138. For example, each record of the event database 138 may include data regarding a past IT event, an executed procedure, and a level of success of the executed procedure. In some implementations, the event module 132 may determine a success score for each event-procedure relation based on counts of records in the event database 138 that are associated with various levels of success. An example data structure 400 for calculating success scores is described below with reference to FIG. 4.

In one or more implementations, the procedures for remediating IT events (e.g., associated with the event-procedure relations in the relation data 136) may be defined in the procedure library 137. For example, the procedure library 137 may define auto-executable procedures using one or more of command line scripts, binary executables, software tools, workflows, and so forth. In some examples, the procedure library 137 may define as templates that include placeholders for various parameters (e.g., hostname, IP address, user, etc.). In such examples, executing a procedure may include replacing the placeholders with actual parameter data that is specific to the current execution. In some implementations, the procedure library 137 may define manually-executable procedures in terms of written instructions to be carried out for human operators.

Figure 2:
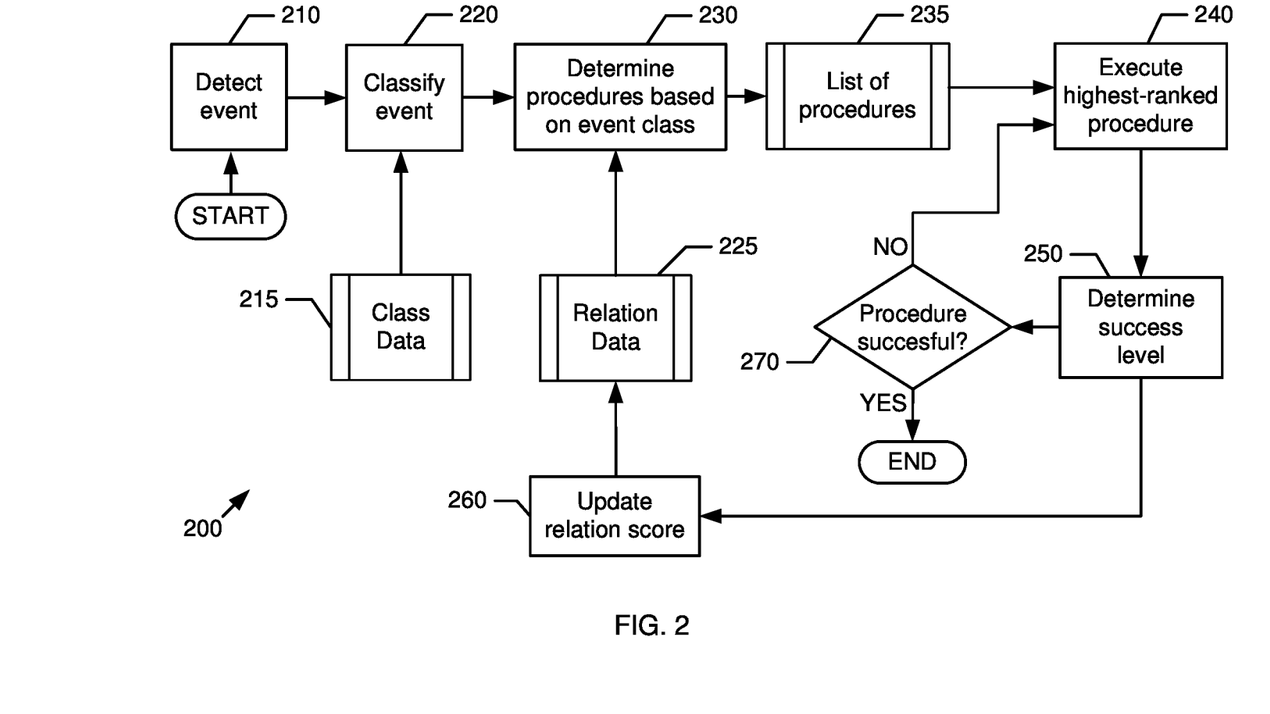
FIG. 2 is an illustration of an example process, in accordance with some implementations.

Referring now to FIG. 2, shown is an example process 200, in accordance with some implementations. In some examples, the process 200 may be performed by some or all of the computing device 110 shown in FIG. 1. The process 200 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 200 may be described below with reference to FIG. 1, which shows an example in accordance with some implementations. However, other implementations are also possible.

Block 210 may include detecting an event. For example, referring to FIG. 1, the event module 132 may receive an alert or request associated with an IT event (e.g., hardware fault, software error, network outage, etc.).

Block 220 may include classifying the event. In some implementations, an event class is determined by classifying the event according to stored class data 215. For example, referring to FIG. 1, the event module 132 may compare keywords and/or attributes associated with the IT event to the class identifiers in the class data 135. The event module 132 may identify the event class specified in the class data 135 with the largest number of class markers that match the keywords and/or attributes associated with the IT event.

Block 230 may include determining procedures based on the event class. In some implementations, the stored relation data 225 is used to generate a list of procedures 235 that are associated with the event class. Further, in some implementations, the list of procedures 235 is sorted according to the success scores in the relation data 225. For example, referring to FIG. 1, the event module 132 may identify a set of event-procedure relations in the relation data 136 that match the event class of the IT event, and may identify the procedures specified in the set of event-procedure relations. The identified procedures may be included in a list sorted in decreasing order of the success scores of the set of event-procedure relations (e.g., as specified in the relation data 136).

Figure 3:
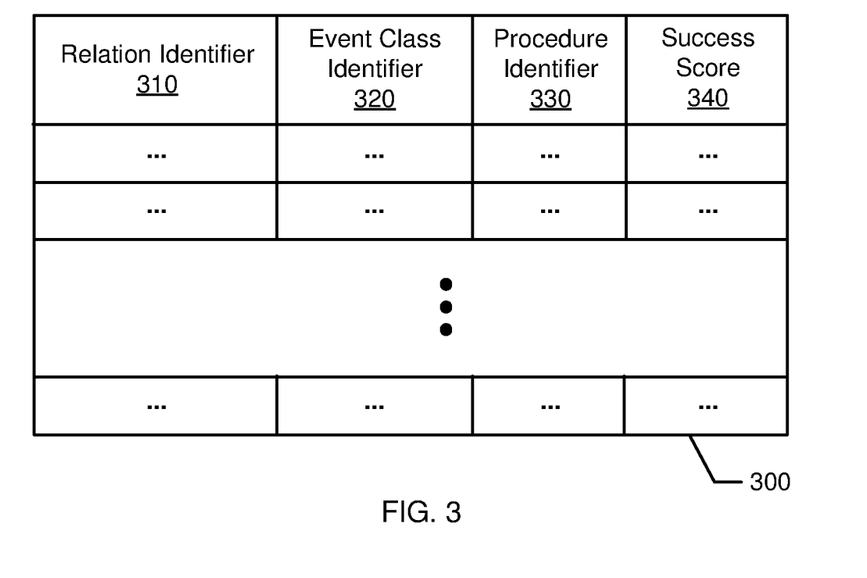
FIG. 3 is an illustration of an example relation data structure, in accordance with some implementations.

Referring now to FIG. 3, shown is an illustration of an example relation data structure 300, in accordance with some implementations. The relation data structure 300 may correspond generally to the relation data 136 shown in FIG. 1, and/or the relation data 225 shown in FIG. 2. As shown, the relation data structure 300 may include multiple records corresponding to event-procedure relations. For example, as shown, each record can comprise multiple fields including a relation identifier 310, an event class identifier 320, a procedure identifier 330, and a success score 340. In some implementations, each record of the relation data structure 300 may define a unique event-procedure relation (i.e., a combination of a specific event class and a specific procedure).

In some implementations, the relation identifier 310 may uniquely identify each event-procedure relation. The event class identifier 320 may identify a particular event class (e.g., one of the event classes indicated by the class data 215). The procedure identifier 330 may identify a particular procedure (e.g., one of the procedures defined in the procedure library 137 shown in FIG. 1). The success score 340 may be a calculated metric that indicates a degree of success of past executions of the procedure (identified by the procedure identifier 330) to remediate an IT event associated with the event class (identified by the event class identifier 320). In some implementations, the success score 340 may be used to sort the list of procedures 235 in order of success score.

Referring again to FIG. 2, block 240 may include executing the highest-ranked procedure in the list 235. In some implementations, the highest ranked procedure is associated with the event-procedure having the highest success score. For example, referring to FIGS. 1 and 3, the event module 132 may identify the procedure of the list of procedures 235 that is ranked highest in terms of associated success scores (e.g., as indicated by the event-procedure relations in the relation data 136). In some examples, the event module 132 may automatically execute the procedure using procedure data (e.g., command line scripts, executables, software tools, workflows, etc.) from the procedure library 137 to remediate the IT event. In other examples, a user may manually execute the procedure according to the procedure data from the procedure library 137 to remediate the IT event.

Block 250 may include determining a level of success associated with the executed procedure. For example, referring to FIG. 1, the event module 132 may determine whether IT system data (e.g., performance metrics and/or indicators, status queries and/or reports, alert status, power consumption, etc.) matches defined operating range(s). In some implementations, the event module 132 may determine that the IT system has returned to a normal operating status, and may thus determine that the procedure was successful in remediating the IT event. Further, the event module 132 may determine that operating status has improved but is not yet back to normal, and may thus determine that the procedure was helpful in remediating the IT event. Furthermore, the event module 132 may determine that operating status has not improved, and may thus determine that the procedure was not helpful in remediating the IT event. In some implementations, the event module 132 may determine the level of success of an executed procedure based at least in part on a success rating provided by a human user. After block 250, the process 200 continues at block 260 and at diamond 270 (described below).

Block 260 may include updating the success score of the relation associated with the executed procedure. In some implementations, the updated success score of the associated relation may be stored in the relation data 225. For example, referring to FIGS. 1 and 3, the event module 132 may use the level of success of the executed procedure (e.g., determined at block 250) to calculate an updated success score of the executed event-procedure relation (e.g., in score value field 340). An example calculation for calculating a relation success score is described below with reference to FIG. 4.

Diamond 270 may include making a determination about whether the executed procedure was successful in remediating the event. If it is determined at diamond 270 that the procedure was not successful (e.g., was determined to be either helpful or not helpful), the process 200 may return to block 240 to execute the next-highest procedure in the list 235 (e.g., the procedure associated with the next-highest success score). However, if it is determined at diamond 270 that the procedure was successful, the process 200 may be completed.

Figure 4:
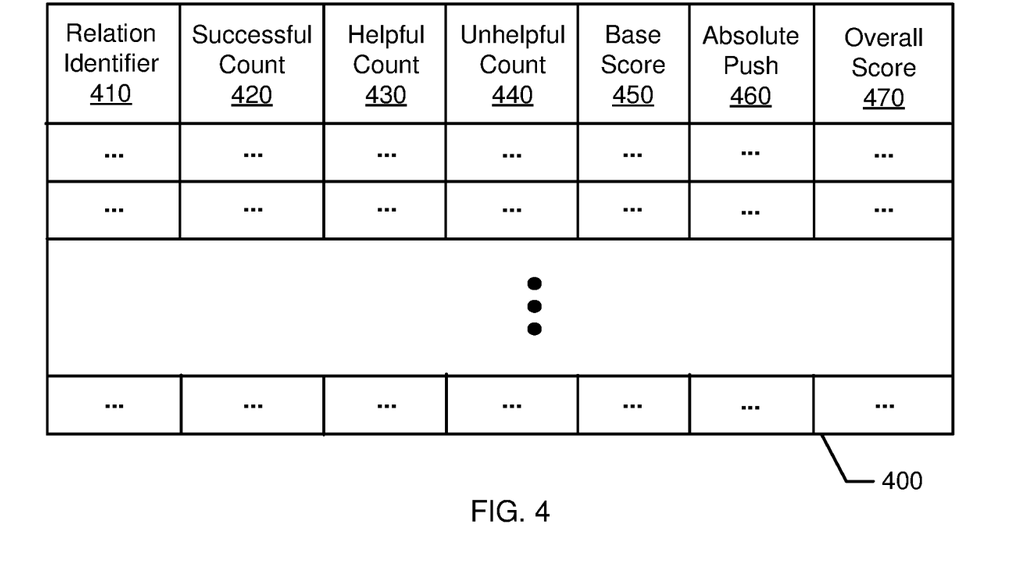
FIG. 4 is an illustration of an example scoring data structure, in accordance with some implementations.

Referring now to FIG. 4, shown is an illustration of an example score data structure 400, in accordance with some implementations. The score data structure 400 may store data in one or more organized structures (e.g., relational tables, extensible markup language (XML) files, flat files, and so forth). In some implementations, the event module 132 (shown in FIG. 1) may access the score data structure 400 to determine success scores associated with event-procedure relations (e.g., in relation data 136 and/or relation data 225).

As shown, the score data structure 400 may comprise various fields including a relation identifier 410, a successful count 420, a helpful count 430, an unhelpful count 440, a base score 450, an absolute push value 460, and an overall score 470. The relation identifier 410 may identify a particular event-procedure relation. The successful count 420 may indicate the count of instances of executed procedures that resolved IT events in a given event class. The helpful count 430 may indicate the count of instances of executed procedures that improved but did not resolve IT events in the event class. The unhelpful count 440 may indicate the count of instances of executed procedures that did not improve or resolve IT events in the event class.

In one or more implementations, the base score 450 may be calculated based on the successful count 420, the helpful count 430, and the unhelpful count 440. Specifically, if the unhelpful count 440 is greater than zero, the base score 450 may be calculated as the successful count 420 divided by the sum of the unhelpful count 440 and the successful count 420. This calculation may be represented by the following formula:

Base_Score=Successful_Count/(Successful_Count+ Unhelpful_Count)

However, if the unhelpful count 440 is equal to zero, the base score 450 may be calculated as the successful count 420 divided by the sum of the helpful count 430 and the successful count 420. This calculation may be represented by the following formula:

Base_Score=Successful_Count/(Successful_Count+ Helpful_Count)

In one or more implementations, the absolute push value 460 may be calculated based at least in part on the base score 450. For example, if the base score 450 is greater than zero, the absolute push value 460 may be calculated by determining a ratio of the helpful count 430 to the total number of executions (i.e., the helpful count 430 divided by the sum of the successful count 420, the helpful count 430, and the unhelpful count 440). The absolute push value 460 may be calculated by multiplying the determined ratio by a product of the base score 450 times a maximum push value. In some implementations, the maximum push value may be a configuration setting of a specified percentage or proportion (e.g., 20% or 0.2). This calculation may be represented by the following formula:

Absolute_Push=(Helpful_Count/Total_Executions)× Base_Score×Max_Push

However, if the base score 450 is not greater than zero, the absolute push value 460 may be calculated as the product of half the maximum push value times the helpful count 430, and dividing this product by the sum of the helpful count 430 and the unhelpful count 440. This calculation may be represented by the following formula:

$$\text{Absolute\_Push} = (\text{Helpful\_Count} \times \text{Max\_Push} \times 0.5) / (\text{Helpful\_Count} + \text{Unhelpful\_Count})$$

In one or more implementations, the overall score 470 may be calculated as the sum of the base score 450 and the absolute push value 460. In some implementations, the overall score 470 may be also be stored in the success score field 340 in relation data structure 300 (shown in FIG. 3). The calculation of the overall score 470 may be represented by the following formula:

$$\text{Overall\_Score} = \text{Base\_Score} + \text{Absolute\_Push}$$

Figure 5:
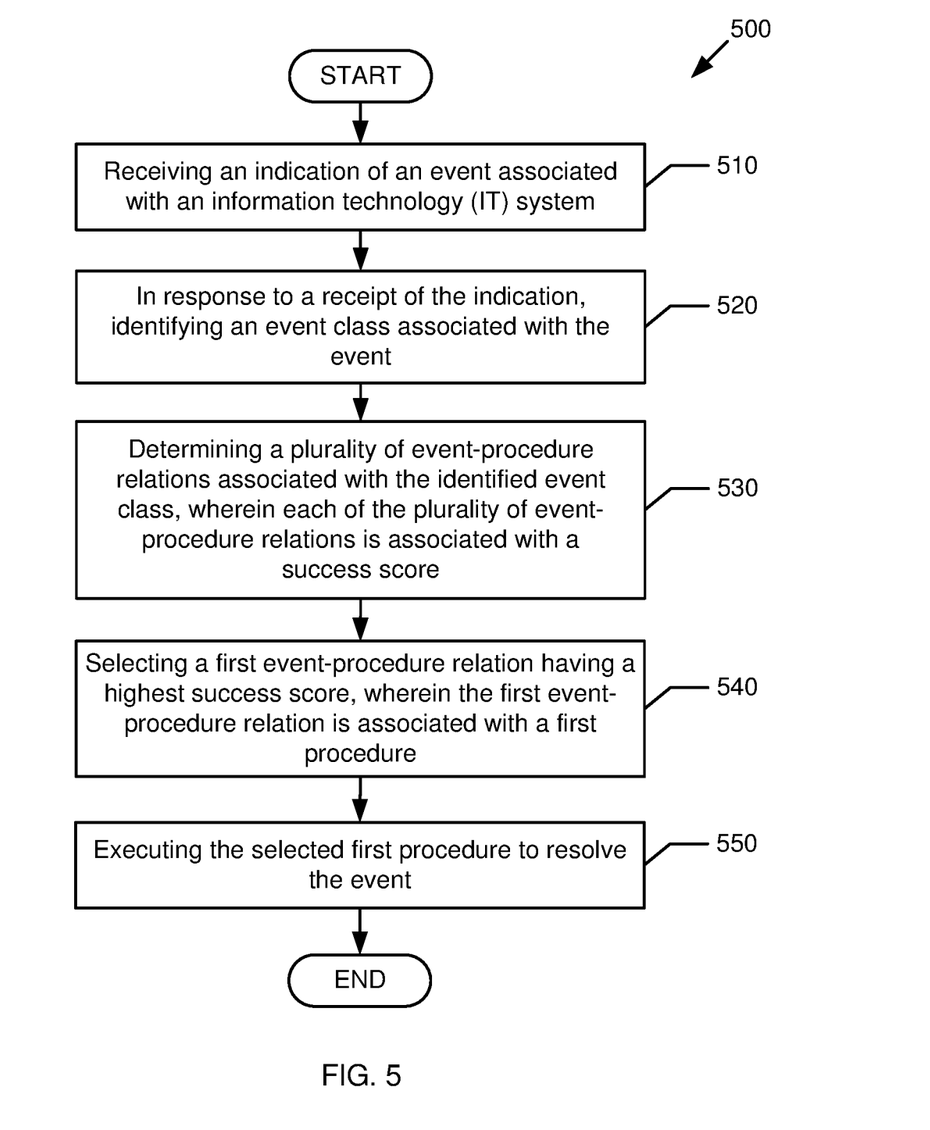
FIG. 5 is an illustration of an example process, in accordance with some implementations.

Referring now to FIG. 5, shown is an example process 500, in accordance with some implementations. In some examples, the process 500 may be performed by some or all of the computing device 110 shown in FIG. 1. The process 500 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1-4, which show examples in accordance with some implementations. However, other implementations are also possible.

Block 510 may include receiving an indication of an event associated with an information technology (IT) system. For example, referring to FIG. 1, the event module 132 may receive an alert or request indicating an IT event.

Block 520 may include, in response to a receipt of the indication, identifying an event class associated with the event. For example, referring to FIG. 1, the event module 132 may use the class data 135 to determine an event class associated with the IT event.

Block 530 may include determining a plurality of event-procedure relations associated with the identified event class, wherein each of the plurality of event-procedure relations is associated with a success score. For example, referring to FIG. 1, the event module 132 may identify a set of event-procedure relations in the relation data 136 that match the event class of the IT event.

Block 540 may include selecting a first event-procedure relation having a highest success score, wherein the first event-procedure relation is associated with a first procedure. For example, referring to FIG. 1, the event module 132 may select, from the set of event-procedure relations matching the event class, the event-procedure relation that has the highest success score. The selected event-procedure relation includes a particular procedure that can be applied to the event class.

Block 550 may include executing the selected first procedure to resolve the event. For example, referring to FIGS. 1 and 3, the event module 132 may use the procedure library 137 to access procedure data to perform the procedure associated with the selected event-procedure relation. In some implementations, the event module 132 may automatically execute (or cause to be executed) the procedure according to the data stored in the procedure library 137. After block 550, the process 500 is completed.

Figure 6:
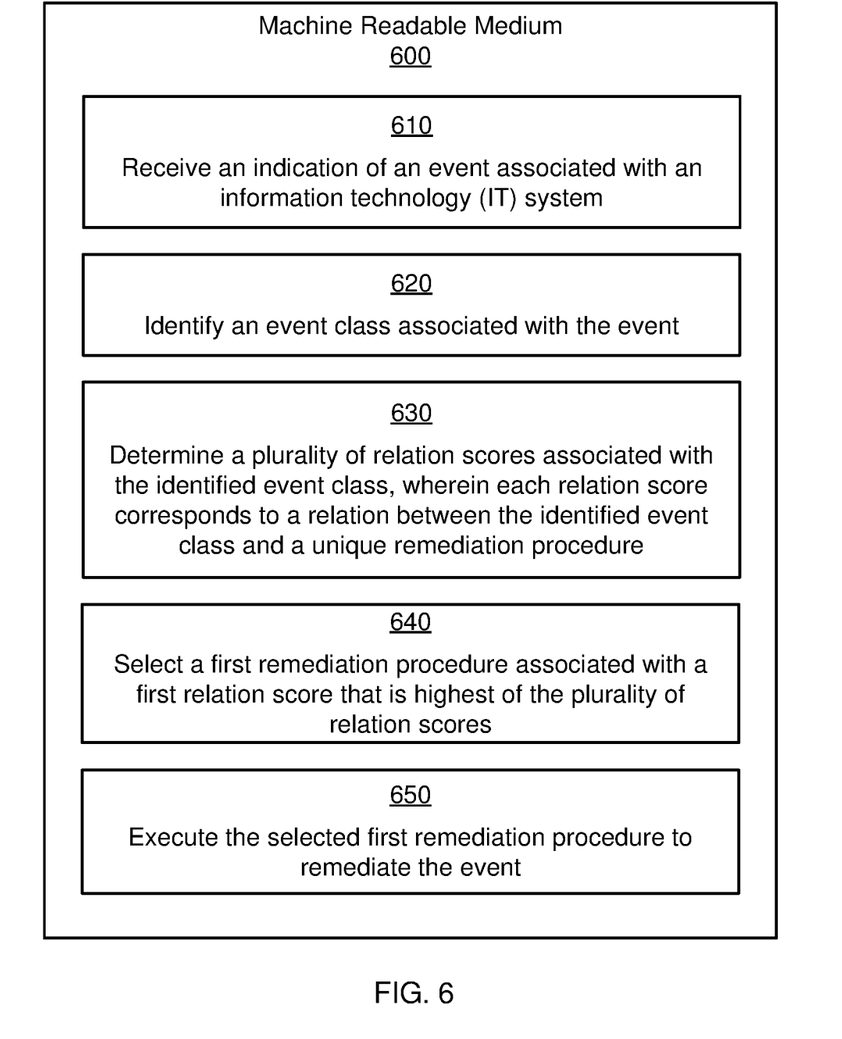
FIG. 6 is a diagram of an example machine-readable medium storing instructions in accordance with some implementations.

Referring now to FIG. 6, shown is machine-readable medium 600 storing instructions 610-650, in accordance with some implementations. The instructions 610-650 can be executed by any number of processors (e.g., the processor(s) 115 shown in FIG. 1). The machine-readable medium 600 may be a non-transitory storage medium, such as an optical, semiconductor, or magnetic storage medium.

Instruction 610 may be executed to receive an indication of an event associated with an information technology (IT) system. Instruction 620 may be executed to identify an event class associated with the event. Instruction 630 may be executed to determine a plurality of relation scores associated with the identified event class, wherein each relation score corresponds to a relation between the first event class and a unique remediation procedure. Instruction 640 may be executed to select a first remediation procedure having a highest value of the plurality of relation scores. Instruction 650 may be executed to execute the selected first remediation procedure to remediate the event.

Figure 7:
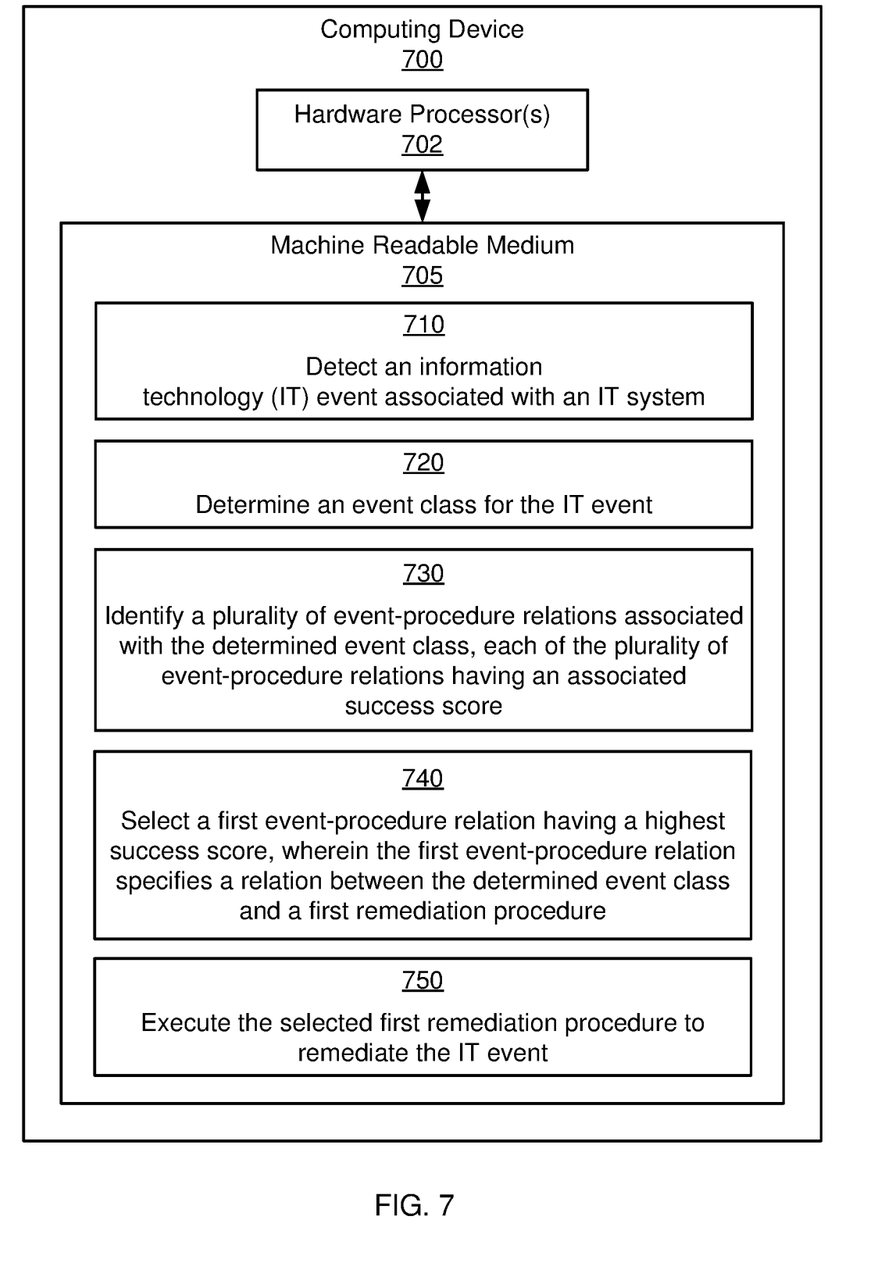
FIG. 7 is a schematic diagram of an example computing device, in accordance with some implementations.

Referring now to FIG. 7, shown is a schematic diagram of an example computing device 700. In some examples, the computing device 700 may correspond generally to the computing device 110 shown in FIGS. 1-2. As shown, the computing device 700 may include hardware processor(s) 702 and machine-readable storage medium 705. The machine-readable storage medium 705 may be a non-transitory medium, and may store instructions 710-750. The instructions 710-750 can be executed by the hardware processor(s) 702.

Instruction 710 may be executed to detect an event associated with an information technology (IT) system. Instruction 720 may be executed to determine an event class for the event. Instruction 730 may be executed to identify a plurality of event-procedure relations associated with the determined event class, each of the plurality of event-procedure relations having an associated success score. Instruction 740 may be executed to select a first event-procedure relation having a highest success score, wherein the first event-procedure relation specifies a relation between the determined event class and a first remediation procedure. Instruction 750 may be executed to execute the selected first remediation procedure to remediate the event.

Note that, while FIGS. 1-7 show various examples, other implementations are contemplated. For example, referring to FIG. 1, it is contemplated that the system 100 may include any number of devices or systems. In another example, it is contemplated that the relation data 136 may be located and/or stored in a different device than the computing device 110. In still another example, it is contemplated that the calculation of the overall score 470 may be performed without using the stored data structure 400 (e.g., using queries to obtain the counts 420-220 on the fly). Further, while FIGS. 3-4 show example data structures 300, 400, implementations are not limited in this regard. For example, the data structure 300 and/or the data structure 400 could include fewer fields, additional fields, different fields, and so forth. Other combinations and/or variations are also possible.

In accordance with some implementations, examples are provided for automated remediation of IT events. In some examples, an IT event may be classified into an event class. The event class may be matched to an event-procedure relation that includes success score. In some implementations, the success score is generated based on multiple result categories assigned to previous instances of applying a given procedure to a particular event. The procedure associated with the event-procedure relation may be executed. In this manner, the procedure may be automatically selected and executed to remediate the IT event based on calculated success scores. Accordingly, some implementations may provide improved automated remediation of IT events.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
a hardware processor; and
a machine-readable storage medium storing instructions, the instructions executable by the hardware processor to:
detect an information technology (IT) event associated with an IT system;
determine a particular event class for the IT event;
identify a plurality of event-procedure relations associated with the particular event class using a relation data structure, wherein the relation data structure comprises a plurality of records, wherein each record of the relation data structure identifies a unique event-procedure relation between a single event class and a single remediation procedure that remediates events in the single event class, and wherein each record of the relation data structure includes a single relation identifier identifying the unique event-procedure relation, a single event class identifier identifying the single event class, a single procedure identifier identifying the single remediation procedure, and a success score indicating a degree of success of past executions of the single remediation procedure to remediate the events in the single event class;
select, among the plurality of event-procedure relations, a first event-procedure relation according to a weighted formula based on a number of keywords in the first event-procedure relation that match the IT event and the success score of the first event-procedure relation, wherein the first event-procedure relation specifies a relation between the particular event class and a first remediation procedure; and
responsive to the selection of the first event-procedure relation, execute the first remediation procedure to remediate the IT event.

2. The computing device of claim 1, wherein, to determine the particular event class for the IT event, the instructions cause the hardware processor to:
compare keywords of the IT event to keywords of each of a plurality of event classes, and
based on the comparison, identify one of the plurality of event classes that has a largest number of keywords that match the keywords of the IT event as the particular event class for the IT event.

3. The computing device of claim 1, wherein the instructions are executable by the hardware processor to:
determine a level of success of the execution of the first remediation procedure to remediate the IT event; and
update the success score of the first event-procedure relation based on the level of success of the execution.

4. The computing device of claim 1, wherein the first remediation procedure is defined in a stored procedure library, and comprises at least one script.

5. The computing device of claim 1, wherein the instructions are executable by the hardware processor to:
determine a plurality of counts of executions of the first remediation procedure associated with the particular event class, wherein each count of the plurality of counts is associated with a particular success level of a plurality of success levels; and
calculate the success score of the first event-procedure relation based on the plurality of counts.

6. The computing device of claim 5, wherein the plurality of counts of executions of the first remediation procedure comprises a successful count, a helpful count, and an unhelpful count, wherein:
the successful count indicates a count of executions of the first remediation procedure that resolved IT events in the particular event class,
the helpful count indicates a count of executions of the first remediation procedure that improved but did not resolve the IT events in the particular event class, and
the unhelpful count indicates a count of executions of the first remediation procedure that did not improve or resolve the IT events in the particular event class.

7. A non-transitory machine-readable storage medium storing instructions that upon execution cause a processor to:
receive an indication of an event associated with an information technology (IT) system;
identify a particular event class associated with the event;
identify a plurality of event-procedure relations associated with the particular event class using a relation data structure, Wherein the relation data structure comprises a plurality of records, wherein each record of the relation data structure identifies a unique event-procedure relation between a single event class and a single remediation procedure that remediates events in the single event class, and wherein each record of the relation data structure comprises a single relation identifier identifying the unique event-procedure relation, a single event class identifier identifying the single event class, and a single procedure identifier identifying the single remediation procedure;
determine a plurality of success scores associated with the plurality of event-procedure relations, wherein each success score corresponds to one of the plurality of event-procedure relations;
select, among the plurality of event-procedure relations, a first event-procedure relation according to a weighted formula based on a number of keywords in the first event-procedure relation that match the event and a first success score of the first event-procedure relation, wherein the first event-procedure relation specifies a relation between the particular event class and a first remediation procedure; and execute the first remediation procedure to remediate the event.

8. The non-transitory machine-readable storage medium of claim 7, wherein the instructions further cause the processor to:

determine a level of success of the execution of the first remediation procedure to remediate the event; and update the first success score based on the level of success of the execution of the first remediation procedure.

9. The non-transitory machine-readable storage medium of claim 7, wherein each record further comprises a success score indicating a degree of success of past executions of the single remediation procedure identified by the single procedure identifier.

10. The non-transitory machine-readable storage medium of claim 7, wherein the instructions cause the processor to;

determine a plurality of counts of executions of the first remediation procedure associated with the particular event class, wherein each count of the plurality of counts is associated with a particular success level of a plurality of success levels: and calculate the first success score based on the plurality of counts of executions.

11. The non-transitory machine-readable storage medium of claim 10, wherein the plurality of counts of executions of the first remediation procedure comprises a successful count, a helpful count, and an unhelpful count, wherein:

the successful count indicates a count of executions of the first remediation procedure that resolved events in the particular event class, the helpful count indicates a count of executions of the first remediation procedure that improved but did not resolve the events in the particular event class, and the unhelpful count indicates a count of executions of the first remediation procedure that did not improve or resolve the events in the particular event class.

12. The non-transitory machine-readable storage medium of claim 7, wherein the first remediation procedure is defined in a stored procedure library, and comprises at least one script.

13. A computer implemented method, comprising:

receiving an indication of an event associated with an information technology (IT) system:

in response to a receipt of the indication of the event, identifying a particular event class associated with the event;

determining a plurality of event-procedure relations associated with the particular event class using a relation data structure, wherein determining the plurality of event-procedure relations comprises accessing a stored relation data structure comprising a plurality of records, wherein each record of the stored relation data structure identifies a unique event-procedure relation between a single event class and a single remediation procedure, and wherein each record of the stored relation data structure comprises a single relation identifier identifying the unique event-procedure relation, a single event class identifier identifying the single event class, a single procedure identifier identifying the single remediation procedure, and a success score indicating a degree of success of past executions of the single remediation procedure to remediate events in the single event class;

selecting among the plurality of event-procedure relations, a first event-procedure relation according to a weighted formula based on a number of keywords in the first event-procedure relation that match the event and the success score of the first event-procedure relation, wherein the first event-procedure relation is associated with a first remediation procedure; and responsive to selecting the first event-procedure relation, executing the first remediation procedure to resolve the event.

14. The computer implemented method of claim 13, further comprising:

determining a level of success of the execution of the first remediation procedure to resolve the event; and updating the success score of the first event-procedure relation based on the level of success of the execution.

15. The computer implemented method of claim 13 wherein identifying the particular event class associated with the event comprises:

comparing keywords of the event to keywords of each of a plurality of event classes, and based on the comparison, identifying one of the plurality of event classes that has a largest number of keywords that match the keywords of the event as the particular event class associated with the event.

16. The computer implemented method of claim 13, wherein the first remediation procedure is defined by procedure data stored in a procedure library, wherein executing the first remediation procedure comprises executing a script included in the procedure data.

17. The computer implemented method of claim 13, the method further comprising:

determining a plurality of counts of executions of the first remediation procedure, wherein each count of the plurality of counts is associated with a particular success level of a plurality of success levels; and calculating the success score of the first event-procedure relation based on the plurality of counts.

18. The computer implemented method of claim 17, wherein the event is one selected from a hardware issue and a software issue.

19. The computer implemented method of claim 17, wherein the plurality of counts of execution of the first remediation procedure comprises a successful count, a helpful count, and an unhelpful count, wherein:

the successful count indicates a count of executions of the first remediation procedure that resolved events in the particular event class, the helpful count indicates a count of executions of the first remediation procedure that improved but did not resolve the events in the particular event class, and the unhelpful count indicates a count of executions of the first remediation procedure that did not improve or resolve the events in the particular event class.

* * * * *